G. BUTTRESS.
PERFORATING ATTACHMENT FOR CANS.
APPLICATION FILED AUG. 1, 1911. RENEWED APR. 3, 1913.
1,078,535.
Patented Nov. 11, 1913.
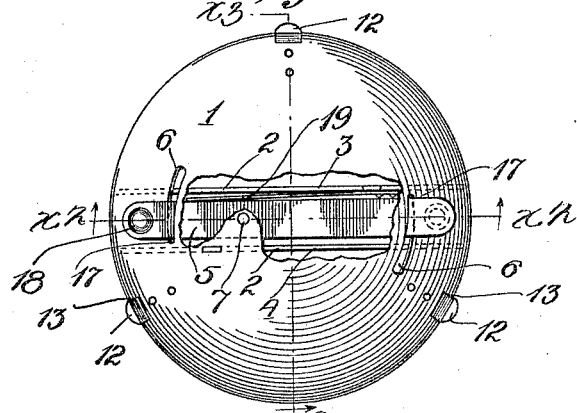
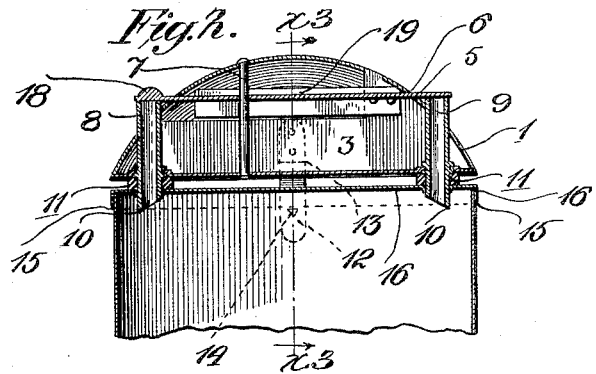
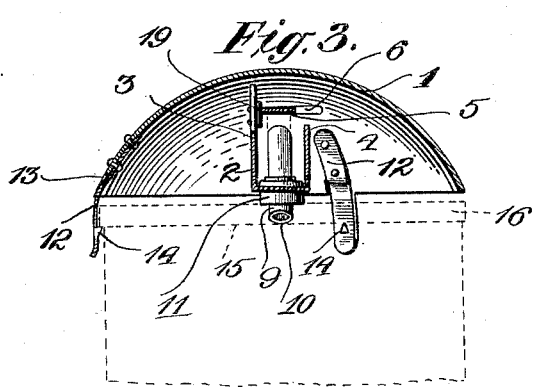
Witnesses:
Inventor,
George Buttress,

UNITED STATES PATENT OFFICE.

GEORGE BUTTRESS, OF LOS ANGELES, CALIFORNIA, ASSIGNOR OF ONE-THIRD TO J. D. BLUSH, ONE-THIRD TO GEORGE F. SHIELDS, AND ONE-THIRD TO L. A. WURTS, ALL OF LOS ANGELES, CALIFORNIA.

PERFORATING ATTACHMENT FOR CANS.

1,078,535.     Specification of Letters Patent.     Patented Nov. 11, 1913.

Application filed August 1, 1911, Serial No. 641,839. Renewed April 3, 1913. Serial No. 758,713.

*To all whom it may concern:*

Be it known that I, GEORGE BUTTRESS, a citizen of the United States, residing at Los Angeles, in the county of Los Angeles and State of California, have invented a certain new and useful Perforating Attachment for Cans, of which the following is a specification.

My invention relates to a perforating attachment for cans and like sealed receptacles and has for its object to prevent the unsightly and unsanitary accumulation of small quantities of the contents thereof about the openings provided therein for the admission of air and the escape of the fluid from the container.

Another object of this invention is to provide an easily attachable and removable perforating cap for cans, which enhances the appearance thereof and absolutely seals the openings therein when not in use, thereby avoiding exposure to infection and liability to decomposition.

With these and other objects in view, the invention consists of the features, details of construction, and combination of parts described in connection with the accompanying drawing, and then more particularly pointed out in the claims.

In the drawing Figure 1 is a plan view of the perforating attachment partially broken to disclose interior mechanism. Fig. 2 is a section on line $X^2 X^2$, Fig. 1, looking in the direction of the arrow, showing the perforators, the sealing washers for the perforators, and the means for attaching the entire arrangement to a can; and Fig. 3 is a section on line $X^3 X^3$, Fig. 2, looking in the direction of the arrow.

The attachment consists of a housing 1, reinforced by a cross-sectionally U-shaped member 2, riveted to the housing. The walls 3 and 4 of said member 2 are cut away on opposite ends to allow freedom of movement of a bar 5 which extends through slots 6 in the housing, and is pivoted therein by pivot 7. The perforators 8 and 9 are securely fastened in and extend below said reinforcing member 2, and slightly above said housing 1, being in direct line with said bar 5. These perforators 8 and 9 severally consist of hollow tubes having sharp edges 10, arranged to cut the top of a can, washers 11, preferably of rubber, being provided thereon to prevent the entrance of any air and the escape of any of the contents of the can between the outside of the tubes and the opening made by the perforators.

The housing 1 is provided with a plurality of resilient tangs 12, riveted to the under side thereof, and bent outwardly into the cut-out portions 13 of the housing, in order to be flush with the contour of the same, as seen in Fig. 3. These tangs 12 are provided with sharp detents 14 which, when the attachment is pressed down upon the top of the can, spring under the edge 15 of the can cover 16.

When the perforators 8 and 9 enter the can top, the washers 11 are compressed and as soon as the detents 14 of the resilient tangs have engaged the edge of the can top, the tendency of the washers to resume their normal condition forces and holds such detents in rigid contact with the edge of the cover, in which position the attachment remains until the contents of the container are emptied. In this manner the seal is perfect.

When it is desired to remove the attachment from a can, the resilient tangs 12, which at their extremities are bent outwardly in order to facilitate entry of the thumb or other member, are forced away from the can, causing the detents on the tangs to escape from the edge of the can cover.

The slots 6 in the housing 1 are tapered as seen at 17, Figs. 1 and 3, for the purpose of causing the bar 5 to form a perfect closure for the hollow perforators 8 and 9, and to facilitate the movement of said bar when operated by the knob 18, to uncover the perforating tubes. The movement of said bar 5 in a direction to uncover the perforating tubes occurs against the tension of a spring 19 which is fastened to the wall 3 of the reinforcing member 2. Consequently, when released, the spring forces the bar 5 back to normal position, closing the openings in the perforators and keeping same closed at all times. With this attachment therefore, the position of a container is immaterial since there can be no escape of the fluid therefrom.

What I claim, is:

1. An attachment for cans and the like comprising a housing, a reinforcing member in said housing, a plurality of hollow perforators secured in said member and extending above said housing, compressible washers on said perforators, a bar pivoted in said housing and laterally movable to cover or uncover said perforators, to seal the same, means to hold said bar normally in contact with the ends of said perforators, and a plurality of resilient members on said housing arranged to engage a can cover to hold said housing on a can.

2. An attachment for cans and the like comprising a housing having a plurality of tapering slots, a reinforcing member in said housing, a plurality of hollow perforating tubes secured in and extending below said reinforcing member, and above said housing, compressible washers on said tubes, a bar pivoted in said housing and extending through the slots therein to cover the openings in said tubes, a spring to normally hold said bar over the openings in said tubes, and a plurality of resilient tangs on said housing, said tangs being provided with detents to engage the edge of a can cover and hold said housing thereon.

3. The combination with a housing having a plurality of tapering slots and a reinforcing member, of a plurality of perforating tubes fastened to said housing and said member, said tubes being provided with compressible washers to form a seal at the point of perforation, a laterally movable bar pivoted in said housing and operating in said slots to cover and uncover the openings in said tubes, a spring to hold said bar wedged on the ends of said tubes, and a plurality of resilient prehensile tangs on said housing provided with means to engage a can cover.

4. The combination with a housing having a plurality of tapering slots, of a reinforcing member in said housing, a plurality of hollow tubes in said reinforcing member and extending above said housing, said tubes having perforating ends, compressible washers on said tubes and adjacent to the ends thereof to form a seal at the point of perforation, a spring actuated means extending through said slots to normally hold said tubes closed, said means being provided with a knob to control the opening of said tubes, and prehensile resilient members on said housing to engage a can top and hold said housing thereon.

In testimony whereof I affix my signature in the presence of two witnesses.

GEORGE BUTTRESS.

Witnesses:
JAMES FORSTER,
ANTON GLOETZNER, Jr.